United States Patent
Neukart et al.

(10) Patent No.: US 11,487,921 B2
(45) Date of Patent: Nov. 1, 2022

(54) SYSTEM AND METHOD FOR FINITE ELEMENTS-BASED DESIGN OPTIMIZATION WITH QUANTUM ANNEALING

(71) Applicant: VOLKSWAGEN AKTIENGESELLSCHAFT, Wolfsburg (DE)

(72) Inventors: Florian Neukart, San Francisco, CA (US); Dyon Van Vreumingen, San Francisco, CA (US); David Von Dollen, San Francisco, CA (US); Arne-Christian Voigt, Braunschweig (DE); Michael Hartmann, Wolfsburg (DE); Carsten Othmer, Braunschweig (DE)

(73) Assignee: Volkswagen Aktiengesellschaft

( * ) Notice: Subject to any disclaimer, the term of this patent is extended or adjusted under 35 U.S.C. 154(b) by 468 days.

(21) Appl. No.: 16/671,498

(22) Filed: Nov. 1, 2019

(65) Prior Publication Data
US 2020/0143008 A1    May 7, 2020

Related U.S. Application Data

(60) Provisional application No. 62/754,661, filed on Nov. 2, 2018.

(51) Int. Cl.
*G06F 30/20* (2020.01)
*G06F 30/23* (2020.01)
(Continued)

(52) U.S. Cl.
CPC .............. *G06F 30/23* (2020.01); *G06F 17/13* (2013.01); *G06F 30/15* (2020.01); *G06N 10/00* (2019.01);
(Continued)

(58) Field of Classification Search
CPC .......... G06F 30/23; G06F 17/13; G06F 30/15; G06F 2111/10; G06F 2119/10;
(Continued)

(56) References Cited

U.S. PATENT DOCUMENTS 9,792,255 B2 * 10/2017 Kusakabe .............. G16C 10/00
10,042,038 B1   8/2018 Lord
(Continued)

FOREIGN PATENT DOCUMENTS

CN    1882198 A   * 12/2006
CN    102063540 B * 3/2013
(Continued)

OTHER PUBLICATIONS

Chudak et al., U.S. Patent Application Publication 2015/0032994, Jan. 2015, see shortened version.*
(Continued)

*Primary Examiner* — Kandasamy Thangavelu
(74) *Attorney, Agent, or Firm* — Barnes & Thornburg, LLP

(57) ABSTRACT

A method and system perform quantum-assisted finite elements-based, design optimization of an object to minimize a shape-specific quantity by manipulating the shape of the object using a processing unit, for example, a Quantum Processing Unit (QPU). As a result, a shape-specific quantity, such as an approximation of sound pressure at a specific position around an object, can be minimized by manipulating the object shape using the QPU.

20 Claims, 10 Drawing Sheets

(51) Int. Cl.
*G06F 17/13* (2006.01)
*G06N 10/00* (2022.01)
*G06F 30/15* (2020.01)
*G06F 111/10* (2020.01)
*G06F 119/10* (2020.01)

(52) U.S. Cl.
CPC ....... *G06F 2111/10* (2020.01); *G06F 2119/10* (2020.01)

(58) Field of Classification Search
CPC . G06F 17/11; G06F 7/60; G06F 17/50; G06F 30/17; G06N 10/00; G06N 20/00; G06N 5/003; Y02T 90/00; A61B 5/0036; A61B 5/005; B60N 2/64; C10C 10/00
See application file for complete search history.

(56) References Cited

U.S. PATENT DOCUMENTS

| | | | |
|---|---|---|---|
| 2015/0032994 A1* | 1/2015 | Chudak | G06N 10/00 712/42 |
| 2015/0106413 A1 | 4/2015 | Ronagh | |
| 2017/0323206 A1 | 11/2017 | Alipour Khayer et al. | |

FOREIGN PATENT DOCUMENTS

| CN | 104603836 | A | * | 5/2015 | ........... A61B 5/0036 |
|---|---|---|---|---|---|
| CN | 103631989 | B | * | 8/2016 | |
| CN | 106484979 | A | * | 3/2017 | ............. G06F 30/15 |
| CN | 107169174 | A | * | 9/2017 | ............. G06F 30/17 |
| CN | 108422909 | A | * | 8/2018 | ............... B60N 2/64 |
| JP | 2017045105 | A | * | 3/2017 | |
| WO | WO 2014/055293 | A1 | * | 4/2014 | ............. A61B 5/005 |
| WO | WO 2015/060915 | A2 | * | 4/2015 | ............... G06F 7/60 |
| WO | WO 2018/178809 | A1 | * | 10/2018 | ............. G06F 17/50 |

OTHER PUBLICATIONS

Kusakabe et al. , U.S. Pat. No. 9,792,255, Oct. 2017, See the shortened version.*
Search Report and Written Opinion for International Patent Application No. PCT/US2019/059329; dated Jan. 21, 2020.
Yuan et al.; T-Drive: Driving Directions Based on Taxi Trajectories; Proceedings of the 18th SIGSPATIAL International Conference on Advances in Geographic Information Systems, GIS '10; 2010; pp. 99-108.
Yuan et al.; Driving with Knowledge from the Physical World; The 17th ACM SIGKDD International Conference on Knowledge, Discovery and Data Mining, KDD '11; 2011.
Zheng; T-Drive trajectory data sample; 2011; downloaded from https://www.microsoft.com/en-us/research/publication/t-drive-trajectory-data-sample/.
Appel; Some techniques for shading machine renderings of solids; Proceedings of the Apr. 30-May 2, 1968, Spring Joint Computer Conference on AFIPS '68 (Spring); 1968.
Babbush et al.; Construction of Energy Functions for Lattice Heteropolymer Models: A Case Study in Constraint Satisfaction Programming and Adiabatic Quantum Optimization; Advances in Chemical Physics; 2014; vol. 155; pp. 201-244.
Bäck et al.; An evolutionary heuristic for the maximum independent set problem; Proceedings of the First IEEE Conference on Evolutionary Computation; IEEE World Congress on Computational Intelligence; 1994.
Bäck et al.; The Handbook of Evolutionary Computation; 1997; vol. 2; pp. 1-11.
Bäck et al.; Automatic Metamodelling of CAE Simulation Models; ATZ Worldwide; 2015; vol. 117, No. 5; pp. 36-41.
Benedetti et al.; Estimation of effective temperatures in quantum annealers for sampling applications: A case study with possible applications in deep learning; Physical Review A; 2016; vol. 94, No. 2.
Biamonte et al.; Quantum Machine Learning; Nature; 2017; vol. 549; pp. 195-202.
Bishop; Pattern Recognition and Machine Learning; 2006; Springer.
Boeing; OSMnx: New Methods for Acquiring, Constructing, Analyzing, and Visualizing Complex Street Networks; Computers, Environment and Urban Systems; 2017; vol. 65; pp. 126-139.
Boixo et al.; Evidence for quantum annealing with more than one hundred qubits; Nature Physics; 2014; vol. 10, No. 3; pp. 218-224.
Crawford et al.; Reinforcement Learning Using Quantum Boltzmann Machines; Quantum Information and Computation; 2016; vol. 18; pp. 51-74.
Duddeck; Multidisciplinary optimization of car bodies; Structural and Multidisciplinary Optimization; 2008; vol. 35, Issue 4; pp. 375-389.
D-Wave Systems; Quantum Computing: How D-Wave Systems Work; 2017; downloaded from https://www.dwavesys.com/quantum-computing.
D-Wave Systems; Qbsolv, a decomposing solver; 2018; downloaded from https://github.com/dwavesystems/qbsolv.
Eisenkrämer; Volkswagen Trials Quantum Computers; 2017; downloaded from https://www.springerprofessional.de/en/automotive-electronics—softwware/companies—institutions/volkswagen-trials-quantum-computers/12170146?wt_$%5C_$mc=offsi.emag.mtz-worldwide.rssnews.-.x.
Ioffe et al.; Batch Normalization: Accelerating Deep Network Training by Reducing Internal Covariate Shift; 2015; arXiv:1502.03167v3.
Isakov et al.; Understanding Quantum Tunneling through Quantum Monte Carlo Simulations; Physical Review Letters; 2016; vol. 117, No. 18.
Jiang et al.; Non-commuting two-local Hamiltonians for quantum error suppression; Quantum Information Processing; 2017; vol. 16, No. 4.
King et al.; Quantum Annealing amid Local Ruggedness and Global Frustration; Journal of the Physical Society of Japan; 2019; vol. 88.
Korenkevych et al.; Benchmarking Quantum Hardware for Training of Fully Visible Boltzmann Machines; Frontiers in Physics; 2016; vol. 2, No. 5.
Lanting et al.; Entanglement in a Quantum Annealing Processor; Physical Review X; 2014; vol. 4, No. 2.
Levit et al.; Free energy-based reinforcement learning using a quantum processor; 2017; arXiv:1706.00074v1.
Los Alamos National Laboratory; D-Wave 2X Quantum Computer; 2016; downloaded from http://www.lanl.gov/projects/national-security-education-center/information-science-technology/dwave/.
Lucas; Ising formulations of many NP problems; Frontiers in Physics; 2014; vol. 2, Article 5.
Nair et al.; Rectified Linear Units Improve Restricted Boltzmann Machines; Proceedings of the 27th International Conference on Machine Learning; 2010; pp. 807-814.
Nesterov; Gradient methods for minimizing composite functions; Math. Program.; 2013.
Neukart et al.; Transgenetic NeuroEvolution; IEEE; Proceedings of OPTIM; 2012.
Neukart et al.; On Quantum Computers and Artificial Neural Networks; Signal Processing Research; 2013; vol. 2, No. 1.
Neukart et al.; Operations on Quantum Physical Artificial Neural Structures; Procedia Engineering; 2014; vol. 69; pp. 1509-1517.
Neukart; Quantum physics and the biological brain; Reverse Engineering the Mind; 2017; pp. 221-229.
Neukart et al.; Quantum-Enhanced Reinforcement Learning for Finite-Episode Games with Discrete State Spaces; Frontiers in Physics; 2018; vol. 5, Article 71.
Neukart et al.; Traffic Flow Optimization Using a Quantum Annealer; Frontiers in ICT; 2017; vol. 4, Article 29.
Neukart et al.; Quantum-assisted cluster analysis; Quantum Physics; 2018; arXiv:1803.02886v1.
O'Gorman et al.; Bayesian Network Structure Learning Using Quantum Annealing; The European Physical Journal Special Topics; 2015; vol. 224, No. 1; pp. 163-188.
Otterlo et al.; Reinforcement Learning and Markov Decision Processes; Adaptation, Learning, and Optimization; Reinforcement Learning; 2012; pp. 3-42.

(56) References Cited

OTHER PUBLICATIONS

Pascanu et al.; Understanding the exploding gradient problem; Computing Research Repository (CoRR); 2012.

Pepper et al.; The Finite Element Method: Basic Concepts and Applications with Matlab®, Maple, and COMSOL; 3rd Edition; CRC Press; 2017.

Perdomo-Ortiz et al. Finding low-energy conformations of lattice protein models by quantum annealing; Scientific Reports; 2012; vol. 2.

Perdomo-Ortiz et al.; A Quantum Annealing Approach for Fault Detection and Diagnosis of Graph-Based Systems; The European Physical Journal Special Topics; 2015; vol. 224, No. 1; pp. 131-148.

Rieffel et al.; A case study in programming a quantum annealer for hard operational planning; Quantum Information Processing; 2014; vol. 14, No. 1.

Sanz-Garcia et al.; Combining genetic algorithms and the finite element method to improve steel industrial processes; Journal of Applied Logic; 2012; vol. 10; pp. 298-308.

Senior et al.; An Empirical Study of Learning Rates in Deep Neural Networks for Speech Recognition; IEEE International Conference on Acoustics, Speech and Signal Processing (ICASSP); 2013; pp. 6724-6728.

Smelyanskiy et al.; Quantum annealing via environment-mediated quantum diffusion; Physical Review Letters; 2017; vol. 118, No. 6.

Smolin et al.; Classical signature of quantum annealing; Frontiers in Physics; 2014; vol. 2, Article 52.

Srivastava et al.; Dropout: A Simple Way to Prevent Neural Networks from Oveifilling; Journal of Machine Learning Research; 2014; vol. 15; pp. 1929-1958.

Sutton et al.; Reinforcement Learning: An Introduction; Robotica; 1999; vol. 17; pp. 229-235.

Venturelli et al.; Job Shop Scheduling Solver based on Quantum Annealing; Proceedings of ICAPS; 2015.

Venturelli et al.; Quantum Optimization of Fully Connected Spin Glasses; Physical Review X; 2015; vol. 5.

Wang et al.; Comment on: Classical signature of quantum annealing; 2013; downloaded from https://arxiv.org/abs/1305.5837.

Whitted; An improved illumination model for shaded display; Communications of the ACM; 1980; vol. 23, No. 6; pp. 343-349.

\* cited by examiner

SYSTEM AND METHOD FOR FINITE ELEMENTS-BASED DESIGN OPTIMIZATION WITH QUANTUM ANNEALING

PRIORITY CLAIM

This patent application is claims priority to U.S. Provisional Patent Application No. 62/754,661, filed 2 Nov. 2018, the disclosure of which being incorporated herein by reference in its entirety.

FIELD

The present disclosure relates to systems, components, and methodologies for finite elements-based design optimization with quantum annealing predicting. In particular, the present disclosure relates to systems, components, and methodologies that use that innovation to characterize, manipulate and optimize a shape-specific quantity, for example, noise resulting from sound pressure, based on a combination of quantum annealing and classical machine learning.

BACKGROUND

Conventionally known, Finite-Element Methods (FEM) are a general group of numerical methods used in various physical tasks. Most well-known is the application of FEM in the investigation of the strength and deformation of solids with a geometrically complex shape. This is because the use of classical methods for investigating strength and deformation, e.g., beam theory, prove to be too time-consuming or impossible to implement.

SUMMARY

According to the present disclosure, systems, components, and methodologies are provided for performing finite elements-based, design optimization of an object shape.

In accordance with disclosed embodiments, structure and software are provided to perform quantum-assisted finite-element design optimization of an object shape.

In accordance with disclosed embodiments, a shape-specific quantity can be minimized by manipulating the shape of the object using a Quantum Processing Unit (QPU). As a result, a shape-specific quantity, such as an approximation of sound pressure at a specific position around an object, can be minimized by manipulating the object shape using the QPU.

In accordance with disclosed embodiments, the method and system may utilize one or more algorithms belonging to the class of quantum-assisted algorithms.

In accordance with disclosed embodiments, evaluation and interpretation of design optimization results may be enabled to occur classically, i.e., non-quantumly, for example, using a digital annealer.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures, which depict illustrative embodiments, and in which.

DETAILED DESCRIPTION

Figure 1:
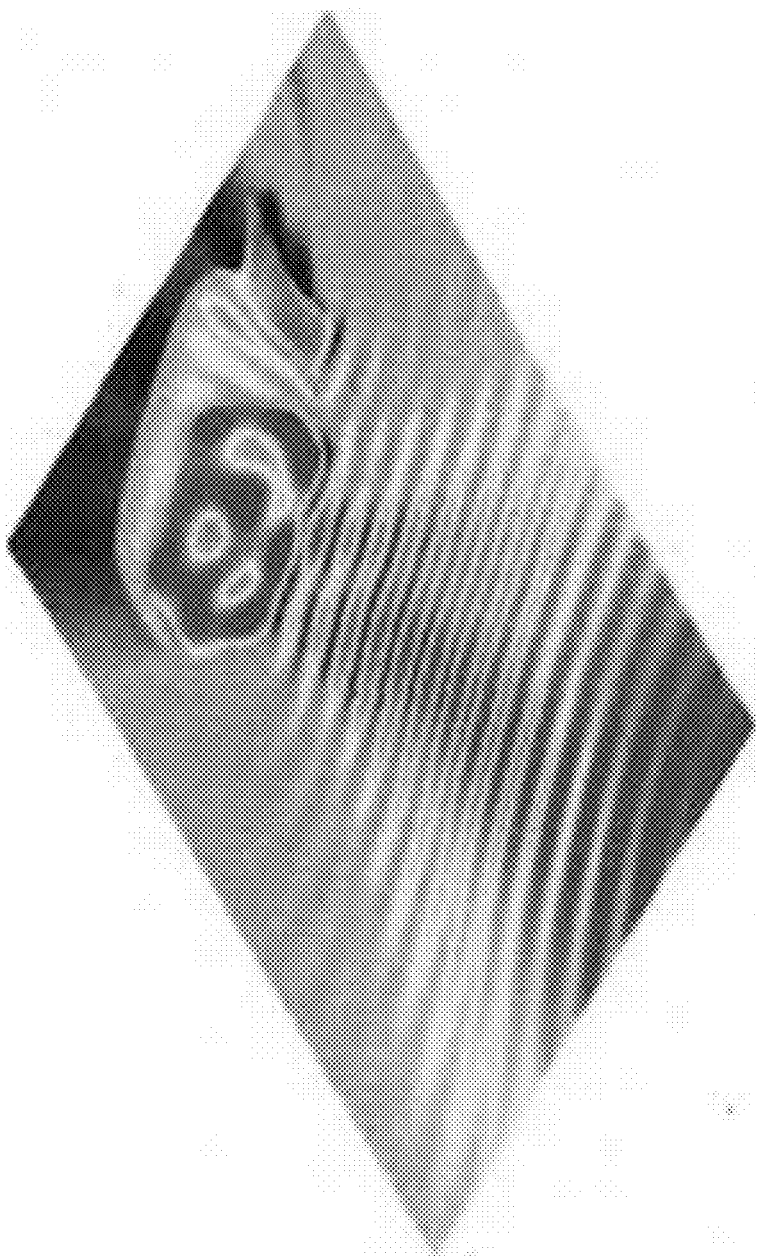
FIG. 1 is a graphical representation of sound waves scattered by an outside transportation vehicle mirror.

The figures and descriptions provided herein may have been simplified to illustrate aspects that are relevant for an understanding of the described devices, systems, and methods, described herein while eliminating, for the purpose of clarity, other aspects that may be found in typical devices, systems, and methods. Those of ordinary skill may recognize that other elements or operations may be desirable or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that could be implemented by those of ordinary skill in the art.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

According to the present disclosure, systems, components, and methodologies are provided for performing finite elements-based, design optimization, in particular quantum-assisted finite-element design optimization.

As mentioned above, FEMs are conventionally used in the investigation of the strength and deformation of solids with a geometrically complex shape because the use of classical methods for investigating strength and deformation are too time-consuming or impossible to implement. Logically, the FEMs are based on the numerical solution of a complex system of differenial equations. The computation domain, e.g., the solid, may be divided into finitely many subdivisions of simple form, or "elements," each having physical behavior that can be well calculated due to their relatively simple geometry using conventionally and well known elementary functions. As a result, the physical behavior of the whole body of the solid is modelled in the transition from one element to the next, through very specific problem-dependent continuity conditions that must be fulfilled by the elementary functions.

These functions contain parameters that usually have a physical meaning, for example, the shift of a certain point in a component at a given time. As a result, the search for the motion function returns to the search for the values functions' parameters. By using more and more parameters, e.g., more and/or smaller elements and higher order functions, the accuracy of the approximate solution can be improved.

Accordingly, the development of FEMs has been possible in essential stages only by the development of powerful computers, because FEMs require considerable computing power.

With this understanding of conventional application of FEM in the investigation of the strength and deformation of solids in mind, presently disclosed embodiments provide the technical ability to minimize a shape-specific quantity by manipulating the shape of the object using a Quantum Processing Unit (QPU), which results, for example, in the technical ability to minimize a shape-specific quantity, for example, approximation of sound pressure at a specific position around an object. As a result, the shape-specific quantity, such as approximation of sound pressure at a specific position around an object, can be minimized by manipulating the object shape using the QPU. One practical example concerns minimizing the wind noise on an external mirror of a transportation vehicle, and another one is minimizing the noises resulting from vibrations caused by the transportation vehicle engine or different road conditions for the transportation vehicle.

Figure 2:
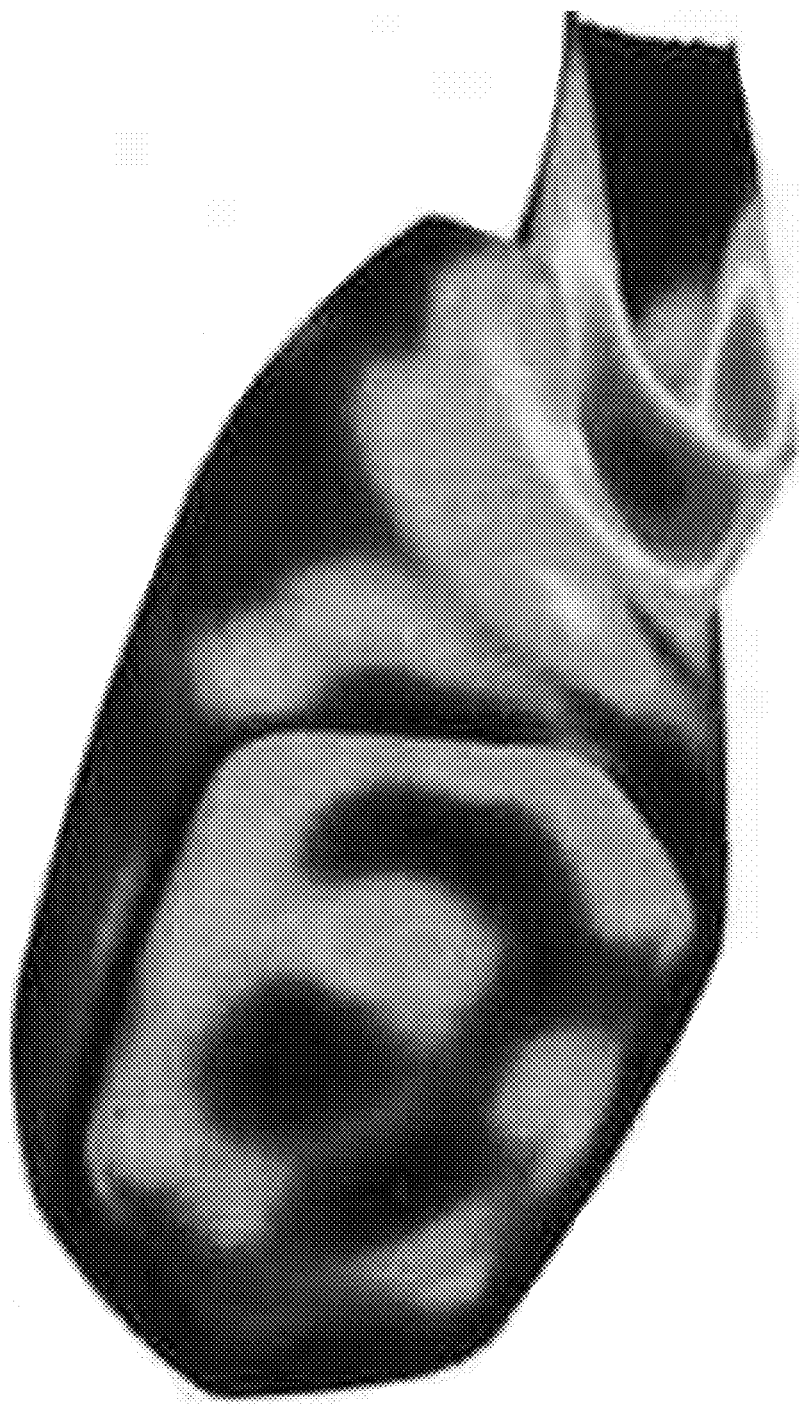
FIG. 2 illustrates a corresponding graphical representation of acoustical sources associated with the sound waves, wherein the color red indicates stronger sources, whereas blue indicates weaker sources.

Conventionally, areas for optimization are commonly obtained by application of a complex finite-element simulation such as that illustrated in FIGS. 1 and 2. FIG. 1 provides a graphical representation of sound waves scattered by an outside transportation vehicle mirror. FIG. 2 illustrates a corresponding graphical representation of acoustical sources associated with the sound waves, wherein the color red indicates stronger sources, whereas blue indicates weaker sources. Additionally, evolutionary algorithms have proven to be very valuable for searching the design space.

Thus, in accordance with at least some disclosed embodiments, the inventive concept may be used as one part of a wind noise prediction simulation, wherein acoustic sources are computed on a transportation vehicle mirror surface. This is an instance of a so-called "acoustic scattering" problem, which has to be solved in order to extract only those sources which are most relevant (contribute most significantly to noise) from the position of the passengers.

Conventionally, solving such an acoustic scattering problem is very time-consuming, especially in real transportation vehicle applications, where the number of elements can be in the order of millions. Moreover, even for a relatively few number of elements, a direct solver implementing straightforward matrix inversion quickly runs into memory and computation time limits in conventionally available hardware.

Thus, disclosed embodiments are directed at providing an algorithm that scales better with an increasing number of elements. In accordance with disclosed embodiments, the method and system may utilize one or more algorithms belonging to the class of quantum-assisted algorithms. In this way, disclosed embodiments may further enable evaluation and interpretation of design optimization results that may be enabled to occur classically, i.e., non-quantumly.

The present state of quantum computing may not enable competition with classical algorithms in terms of the number of elements or the speed. This is because the currently newest version of the commercially available D-Wave™ QPU, a D-Wave™ 20000 QPU, contains approximately 2048 qubits. As a result, that D-Wave™ QPU can only reliably find minor embeddings for shapes with up to 50 elements. Although a Quadratic Unconstrained Binary Optimization (QUBO) process with more than 50 elements could theoretically be divided such that problems of arbitrary size may be split, splitting the QUBO process in this way increases the time needed to reach optimization.

To the contrary, the disclosed embodiments utilize an iterative optimization algorithm, wherein processing begins with an initial shape with the intent of optimizing the shape so that the resulting shape deflects sound waves emitted by an acoustic monopole source such that the sound pressure within an area at another position around the shape is minimized. At the same time, the optimization algorithm should be form-preserving because the resulting shape should still resemble the initial design.

Figure 3:
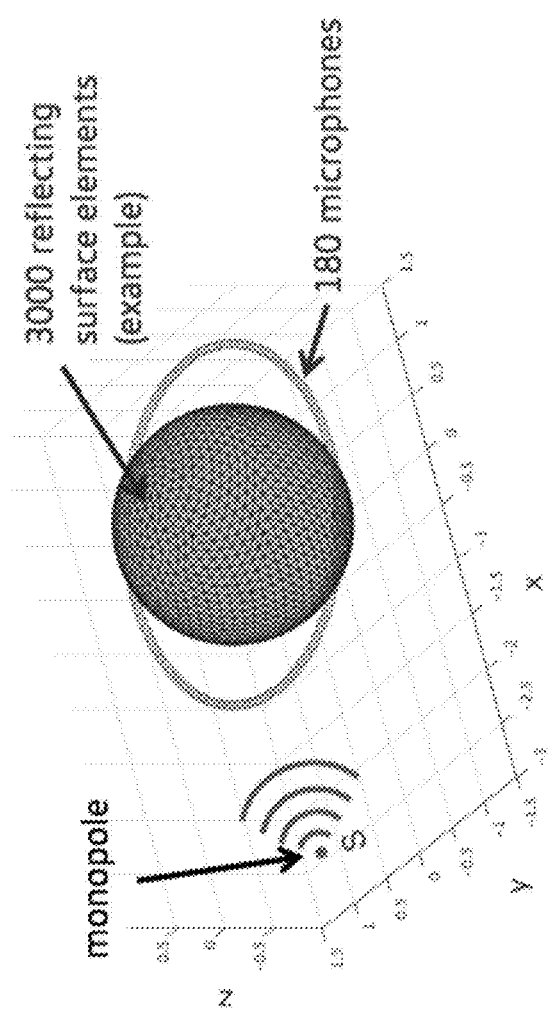
FIG. 3 shows an acoustic monopole emitting a spherical wave scattered by a rigid sphere wherein microphones positioned around the shape, and at any position of choice the sound pressure are minimized by changing the sphere's shape.

For the purposes of explanation of the technical utility of the disclosed embodiments, the innovation is explained herein with relationship to an experimental scenario wherein the initial shape is a sphere consisting of N surface elements, which is hit by sound waves emitted from an acoustic monopole. Thus, FIG. 3 shows an acoustic monopole emitting a spherical wave scattered by a rigid sphere wherein microphones (also termed sensing locations for sensing a shape-specific quantity such as, for example, sound) positioned around the shape, and at any position of choice the sound pressure are minimized by changing the sphere's shape.

Noting that the size of the most recent D-Wave™ 20000 QPU is limited to 2048 qubits and each qubit bears only 6 connections to neighboring qubits, a number of assumptions and approximations may be made in order to make this acoustic scattering problem feasible for submission to the QPU with a reasonable number of elements. More complex formulations are possible; however adding more interactions requires more qubits, which would result in fewer elements.

In the definition of the sound scattering problem, one major simplification may be made to ensure that the resulting formulation is a finite-element method that is well-suited for the QPU. This simplification approximates sound waves as rays. That is, propagation of sound waves is treated similarly to the propagation of light, as is conventionally performed in graphical raytracing.

This simplification greatly improves the optimization processing because it enables the ability to consider each element separately in terms of its contribution to the measured sound pressure. This is because the simplification avoids the necessity to construct a wave-based model harboring high degrees of interaction between elements through sound wave interference. This is possible because it eliminates the need to consider the highly complex situation resulting from a multitude of incident and scattered sound waves; such consideration would require processing that would involve distant (i.e., non-neighboring) element-element coupling.

By devising a QPU-assisted finite-element method for shape optimization, one can describe a "first-order approximation" with only neighbor couplings, rather than being forced to figure out a very accurate scattering solution. Since it is known that sound waves, in reality, reflect linearly off a surface identically to light rays, the simulation used in the design optimization can use this as the approximation to base a quantum-assisted algorithm on.

In implementation, the disclosed embodiments provide and utilize an algorithm that may be a 3D search routine, configured to iteratively analyze different candidate positions for each vertex in the shape. Subsequently, the algorithm tasks the QPU to determine which vertex arrangement causes the least number of rays to be reflected towards a microphone.

Figure 4:
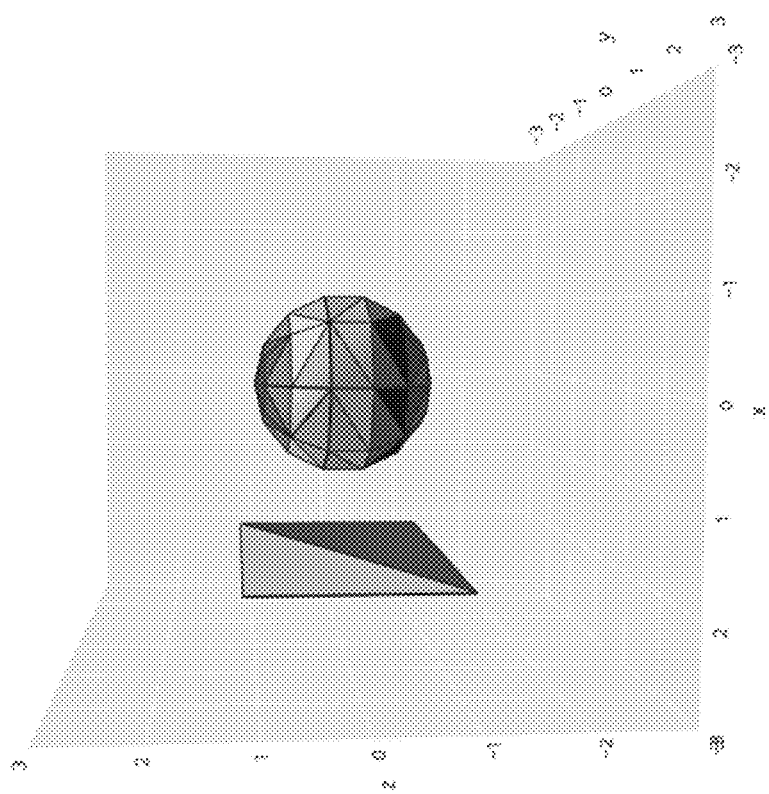
FIG. 4 illustrates a rigid sphere, which serves as the initial shape, and a rectangular area at which the sound pressure is to be minimized, wherein the purpose of the color scheme is visual aid.

For example, FIG. 4 illustrates a rigid sphere, which serves as the initial shape, and a rectangular area at which the sound pressure is to be minimized, wherein the purpose of the color scheme is visual aid. Thus, the microphone is represented by the rectangularly bounded plane positioned next to the shape shown in FIG. 4.

In each iteration, the algorithm may assign K "mutations" to each vertex; these mutations are small random deviations from the original position of vertex. Thus, for each vertex $v^i$ in the set V of vertices, the algorithm considers $v^i + dv_1^i, \ldots, v^i + dv_K^i$ with $dv_K^i$ small. For each triangle (otherwise known as simplex), the partial loss (denoted by the symbol $\ell$, and being the amount of pressure received from this simplex) is computed separately for each of the $K^3$ triangle configurations created from the vertex mutations (wherein there are three vertices per triangle, and K mutations for each vertex $v^i$).

The QUBO matrix Q may then be constructed so that it contains, for each vertex $v^i$, the loss information associated with the simplices neighbouring the vertex. Based on that information, the QPU may choose the least-loss vertex configuration among those supplied, and use the least-loss vertex configuration as the input for the next iteration. Performing this processing in an iterative way may continue until convergence is achieved, or, for a given number of specified iterations set before hand as yielding an acceptably accurate optimization process.

With this context in mind, the technical utility and implementation of the disclosed embodiments may be better understood based on an understanding of QUBO formulation and quantum annealing. To address limitations of classical computing, a quantum annealing system may be used in accordance with disclosed embodiments to enable determination of an optimal solution or a solution close to an optimum possibly within milliseconds. Implementation of quantum computing improves the computational speed because quantum computing is probabilistic, whereas classical computing is deterministic.

According to the laws of quantum mechanics, a quantum mechanical system, which is in the ground state (state of minimal energy) of a time-independent system, remains in the ground state if a change happens only slowly, i.e., adiabatically. This is known as the "adiabatic" theorem.

Accordingly, adiabatic quantum computing first constructs a first system having a ground state that is still unknown at that time; that first system corresponds to solving a particular problem. Another second system is constructed as well; however, the second system's ground state is easy to prepare experimentally. Subsequently, the easy to prepare system (second system) is adiabatically transferred to the system whose ground state one is interested in (first system), and then measured. If the transition is slow enough, one can obtain a minimum-energy solution to the problem can be solved.

D Wave™ QPUs deploy a system described by the two-dimensional Ising spin Hamiltonian:

$$H(s) = \sum_{i \in V} h_i s_i + \sum_{ij \in E} J_{ij} s_i s_j. \tag{1}$$

Here, s is a vector of n spins $\{-1, 1\}$, described by an undirected weighted graph with vertices (V) and edges (E), each spin $s_i$ is a vertex in V, $h_i$ hold the weights for each spin, and $J_{ij}$ are the strengths of couplings between spins (edges in E). The search for the minimum configuration of spins for the qubit hamiltonian is NP-hard.

One class of problems that is known to be equivalent to minimization of Ising spin models is Quadratic Unconstrained Binary Optimization (QUBO). The objective quantity that the QPU minimizes in the QUBO case is given by the quadratic form:

$$\text{Obj}(x,Q) = x^T Q x, \tag{2}$$

where x is a vector of binary variables of size N, and Q is an N×N real-valued upper triangular matrix describing the relationship between the variables.

The equivalence between the two problem classes implies that any problem to be solved with the D-Wave™ QPU may be formulated in a QUBO form, which may then be transformed into an Ising model. That is, in order to submit and solve a problem to the QPU, the problem either has to be formulated as a QUBO instance or formulated directly as an Ising model.

In the QUBO formulation, qubits are used to represent the vertices or variables in a graph, and the couplers represent the costs a pair of qubits is associated with. Thus, D-Wave's QPU physically implements an undirected graph where qubits describe vertices and couples the edges. The initial configuration may be performed such that all spin configurations may be in superposition, thus, purely quantum.

During the quantum annealing cycle, the state may be evolved according to the energy landscape described by Q. Subsequently, when the system reaches the ground state, a minimum solution to the QUBO problem is found.

Accordingly, disclosed embodiments provide a method and system using the QPU as an optimizer for finite-element design problems. In one implementation, disclosed embodiments may be used to optimize the shape of a 3D body defined by a finite number (e.g., two) of elements against certain physical circumstances by, first, expressing the physical interaction of the elements in a QUBO form, and, secondly, having the QPU find the minimum-energy configuration corresponding to a (sub)optimal shape.

Expressing the physical interaction of the elements involves first formulating the QUBO. That formulation first involves defining S as the set of all simplices s determining the shape, $N = |V|$, $N_S = |S|$ and C as the set of all configurations c over the entire shape, where c is a list of vertex mutation assignments $\{(i,j)\}$ with $i \in \{1, \ldots, N\}$ and $j \in \{1, \ldots, K\}$, indicating assignment of mutation j to vertex i (i.e. $v^i \mapsto v^i + dv_j^i$). Each configuration may be a complete list, in that every vertex is assigned only one mutation. The total loss $\mathcal{L}(S, C)$ may then be chosen to be the total of the partial losses $\ell(s, c)$ of simplices s in configuration c, summed over all configurations. This makes $\mathcal{L}$ a function of $K^N$ configurations, taking the following form:

$$\mathcal{L}(S, C) = \sum_{c \in C} \sum_{s \in S} \ell(s, c). \tag{3}$$

Note, this sum can be rewritten by visiting all edges (v, w) in the edge set E, and considering, for each edge, the two simplices adjacent to that edge. Since each simplex has three edges, each simplex is counted thrice; accordingly the new total is divided by three to obtain:

$$\mathcal{L}(S, C) = \sum_{c \in C} \sum_{(v,w) \in E} \sum_{s \in S_{(v,w)}} \ell(s, c) \tag{4}$$

where $S_{(v,w)}$ is the set of the two simplices adjacent to edge (v, w).

Note, there are $K^{N-3}$ configurations which fix a triple of mutations for three vertices of a simplex s, and are, thus, equivalent for this particular simplex. As such, instead of counting each configuration separately, one can consider only $K^3$ configurations that are nonequivalent with respect to this simplex to sum over (represented by the set $C_s$), and multiply the result by $K^{N-3}$:

$$\mathcal{L}(S, C) = \frac{K^{N-3}}{3} \sum_{(v,w) \in E} \sum_{s \in S_{(v,w)}} \sum_{c \in C_s} \ell(s, c). \tag{5}$$

This loss function representation now provides an intuitive way to define a QUBO matrix Q for this problem, which is to be minimized by some binary vector x. The edge pairs naturally correspond to the off-diagonal terms of this matrix: for any edge pair ($v^{i_1}$, $v^{i_2}$) with mutations ($i_1, j_1$) and ($i_2, j_2$) respectively, one need only sum over the partial loss values for all possible configurations regarding the two neighboring simplices. Taking $\hat{\ell}$ ($s_{(i_1, i_2)}^2, j_1, j_2, k$) accordingly for the second adjacent simplex, one can obtain the following matrix form:

$$Q_{i_2, j_2}^{i_1, j_1} = \alpha \sum_{k=1}^{K} \sum_{p \in \{1,2\}} \hat{\ell}(s_{(i_1, i_2)}^p, j_1, j_2, k). \tag{6}$$

Here, α is an energy scaling factor that absorbs the $K^{N-3}/3$ in front of the sum in Eq. 6 (in practice, this $K^{N-3}$ may turn out to be huge, so adjustment may be necessary).

Since Q contains K rows and K columns for each vertex, it is an NK×NK matrix. In this description, we view each binary entry $x_{ij}$ of x as representing whether vertex $v^i$ is assigned mutation j (in which case $x_{ij}=1$) or not (meaning $x_{ij}=0$).

Lastly, it is important to make sure the QPU returns a result vector x in which each vertex is being assigned only one mutation. Since x is binary, this is equivalent to requiring $$\forall i: 0 = -\sum_{j=1}^{K} x_{ij} + 2\sum_{j=1}^{K} \sum_{j'>j}^{K} x_{ij} x_{ij'} + 1. \tag{7}$$

A straightforward way to enforce this requirement may be by adding it as a penalty term to the loss function with some large constant penalty coefficient λ, as proposed in U.S. application Ser. No. 15/827,854, filed 30 Nov. 2017 and entitled "SYSTEM AND METHOD FOR PREDICTING AND MAXIMIZING TRAFFIC FLOW", wherein:

$$\tilde{\mathcal{L}} = \mathcal{L} + \lambda \sum_{i} \left( \sum_{j=1}^{K} x_{ij} - 1 \right)^2. \tag{8}$$

In the QUBO matrix, this may directly translate to adding −λ to the diagonal elements $Q_{ij}^{ij}$ and adding 2λ to the off-diagonal elements $Q_{ij}^{ij'}$, (j'>j) corresponding to vertex $v^i$. Provided λ is large enough, this measure guarantees the QPU sets exactly one of the bits $x_{i1}, \ldots, x_{iK}$ to 1, as any infeasible assignment would cause an increase in loss that would be higher than any possible gain from selecting a different configuration.

Figure 5:
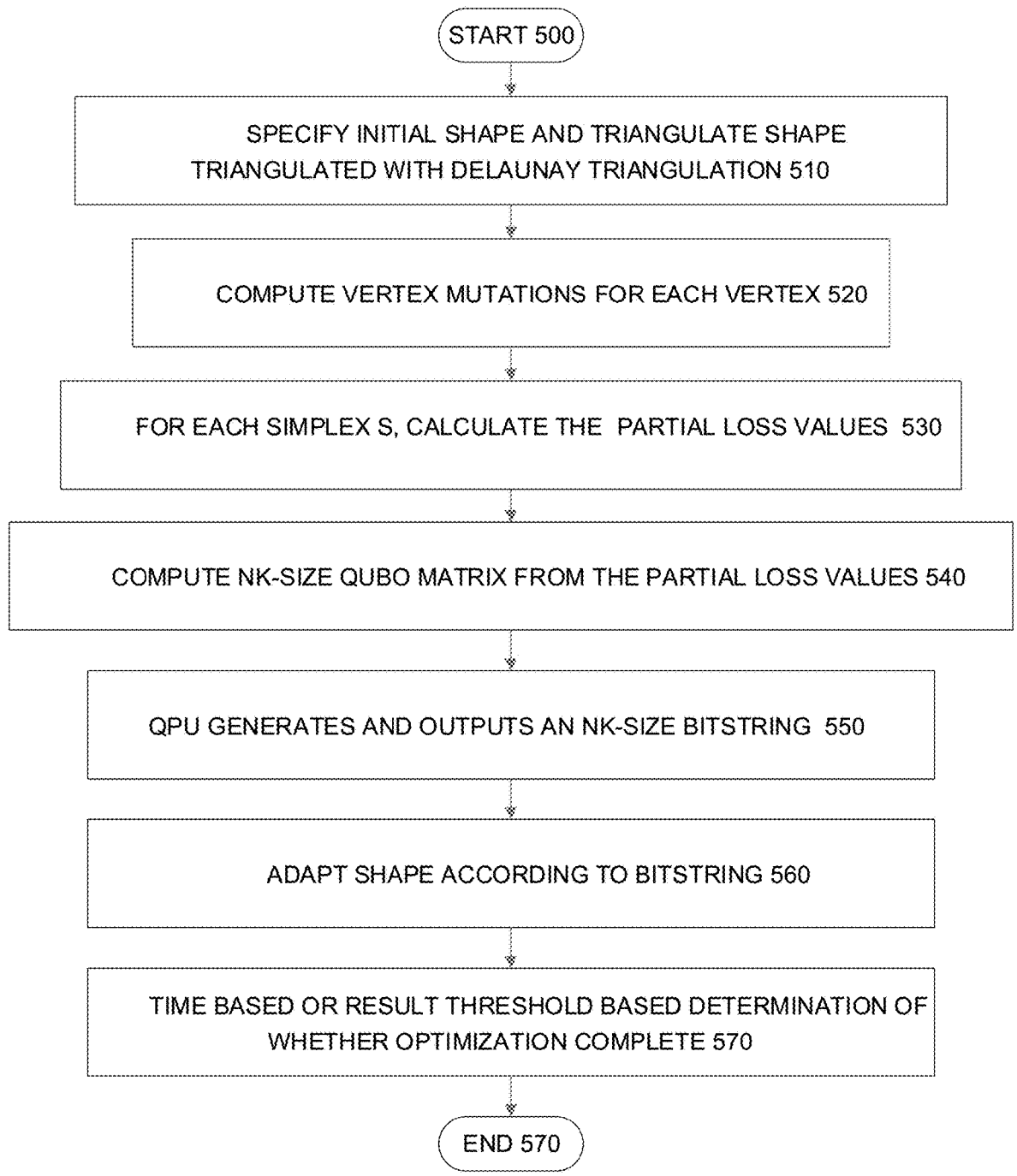
FIG. 5 illustrates an example of operations performed as part of the illustrative algorithm utilized in the disclosed embodiments.

With this explanation of the QUBO formulation in mind, the iterative algorithm is described with reference to FIG. 5. As shown in FIG. 5, the iterative algorithm begins at 500 and control proceeds to 510, at which an initial shape is specified and the shape is triangulated with Delaunay triangulation, which is a common method to create a triangular mesh from a set of points.

With the method of Delaunay triangulation, points in the $\mathbb{R}$ plane may be meshed into triangles so that there are no other points within the circumscribed circle of the triangle (the triangle's perimeter). For example, the method may be used to optimize calculation networks for the finite-element method. In a Delaunay triangulation, all triangles of the triangle mesh satisfy the so-called perimeter condition: the perimeter of a triangle of the mesh must not contain any further points of the given point set. As a result, the triangles of the network have the largest possible internal angles; mathematically speaking, the smallest interior angle over all triangles is maximized.

This feature is very desirable in computer graphics because it minimizes rounding errors. For calculations over the convex hull in 3D, for example, each 2D point is extended by a z coordinate by the relation:

$$z^2 = x^2 + y^2 \tag{9}$$

Thus, the convex hull—a triangular faceted surface—may be created around these 3D dots. The orientation of the triangle normal may be set outwards. If all downwardly oriented triangles (i.e., those with a negative z coordinate of their normal vector) are projected back into the original xy-plane, one obtains the searched 2D-Delaunay-triangle mesh. The complexity of this subroutine is of the order O(n log n).

After this initial setup, the sequence of iterations starts at 520, which is the first operation in each iteration. At 520, K vertex mutations are computed for each vertex. The mutations are chosen probabilistically such that $dv_j^i$ is within a sphere of decreasing radius $R_i = \beta \rho_i t^{-\mu}$, with t the current iteration and μ a constant. That is, each $dv_j^i$ is picked with (uniformly) random tangential and azimuthal angles, and uniformly random radius in the interval [0, $R_i$). Here, $\rho_i$ is a shape-dependent bound for each vertex, whose purpose is to prevent the shape from becoming "chaotic," e.g., the shape having too sharp corners, vertices extruding too far from the shape, edges intersecting other simplices etc., as well as the shape generally containing too many or too deep concavities. In practice, ρ_i may be determined by a soft convexity constraint which ensures that, as long as β≤1, moving a vertex vi by a distance R_i in any direction may approximately retain the convexity of the shape. Since preserval of the convexity from the viewpoint of one vertex depends only on its neighbor vertices (and itself), ρ_i is defined precisely by the position of v_i and the position of its neighbors.

The factor β may act as a control parameter setting the step size of the algorithm. Furthermore, in addition to this (1, K)-like search method (in analogy to (1,λ) search in evolutionary strategies, with selection occurring at 560 discussed below), an option for (1+[K−1]) search was also implemented, by allowing $dv_1^i=0$ for all vertices i.

Control then proceeds to 530, at which, for each simplex s, the $K_3$ partial loss values $\hat{\ell}$ ($s,j_1,j_2,k$) are calculated. These may be determined by casting a set number of rays towards that simplex when its first vertex is in mutation i, its second in mutation j and its third in mutation k, and counting the fraction of rays that hits the rectangular microphone plane.

Control then proceeds to 540, at which, from these partial loss values, the NK x NK-size QUBO matrix Q is computed, as explained above, and submitted to the QPU.

Control then proceeds to 550 wherein the QPU generates and outputs an NK-size bitstring x containing the preferred mutations of each vertex that yield minimal loss among all configurations. As mentioned above, this bitstring may be of the form $[x_{11}, x_{12}, \ldots, x_{1K}; x_{21}, \ldots, x_{2K}; \ldots; x_{N1}, \ldots, x_{NK}]$, where for each vertex i, only one of the bits $x_{i1}, \ldots, x_{iK}$ is 1, indicating the chosen preferred mutation for this vertex, and the others are 0.

Control then proceeds to 560, at which the shape is subsequently adapted according to this bitstring. Subsequently, operations 520-560 are performed repeatedly as necessary, e.g., based on a specified number of times or based on comparison of a generated result meeting specified design thresholds at 570. Control then proceeds to 580 at which the operations end.

Figure 6B:
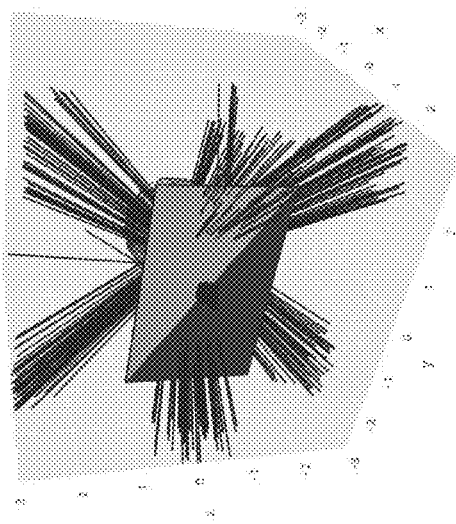
FIGS. 6(a)-6(b) illustrate an initial set up of an experimental example illustrating the technical utility of implementation of the disclosed embodiments.
Figure 6A:
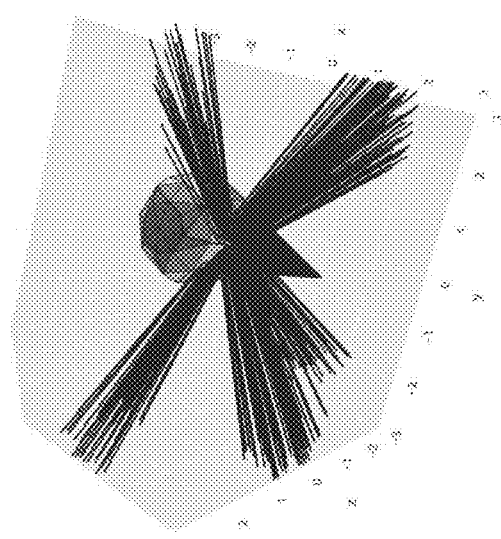

With this understanding of the iterative algorithm in mind, consider the illustrative experimental implementation introduced above and consider the situation with a monopole source sitting at (2.5, 0, 0), wherein the microphone is at x≈2 and is approximately bounded by y∈[−2, 2], z∈[−1.15, 1.15], as illustrated in FIG. 6(a)-6(b). As shown in those figures, FIG. 6(a) shows scattering of 300 incoming rays, casted from the monopole, off the spherical surface. FIG. 6(b) shows a significant number of rays reflected backwards, intersecting the microphone. The rays crossing the microphone in the center are considered incoming rays and are not counted towards the recorded sound pressure.

Figure 7B:
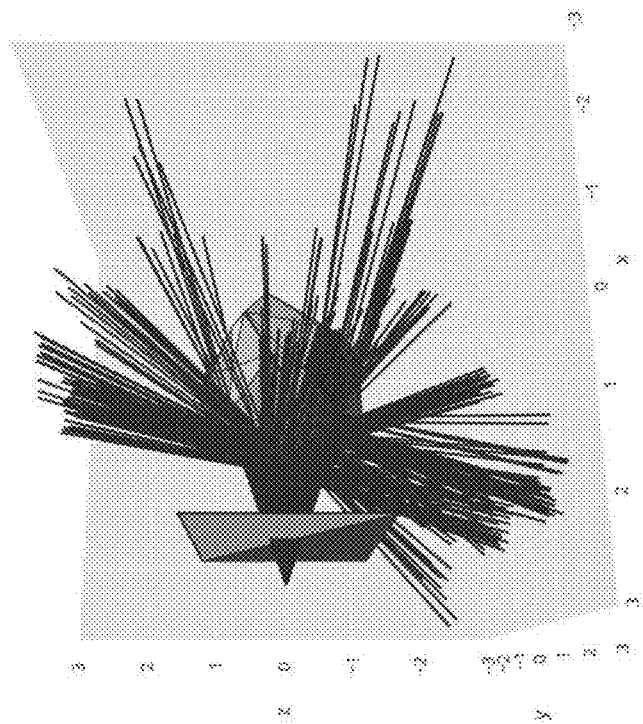
FIGS. 7(a)-7(b) illustrate results associated with execution of the algorithm for an experimental example illustrating the technical utility of implementation of the disclosed embodiments.
Figure 7A:
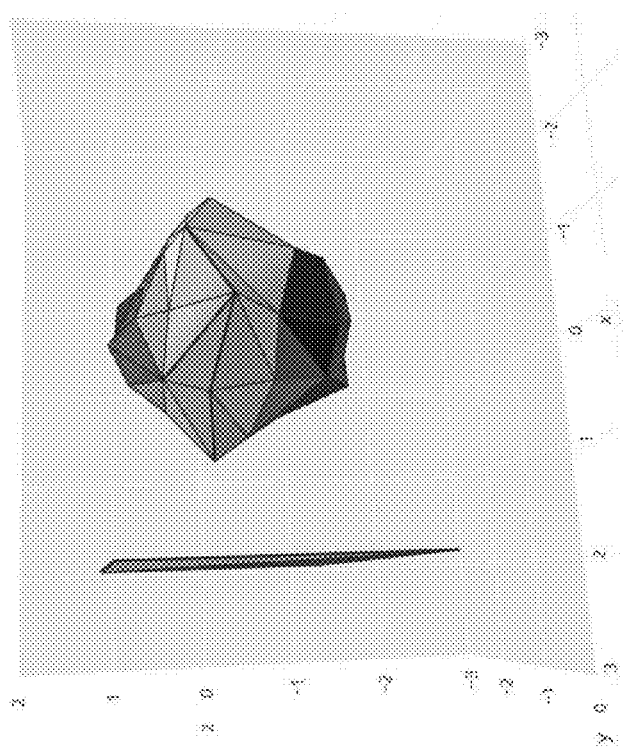

FIGS. 7(a)-7(b) illustrate results after running the iterative optimization algorithm with the monopole at (2.5, 0, 0). As shown in FIG. 7(a), the resulting shape is illustrated in rainbow colors used for visual comprehension. The shape displays a sharp edge at the front, giving it a streamlined structure. As illustrated in FIG. 7(b), for the rays scattering off the new shape, all rays are directed around the microphone plane in one way or another, as can be seen from the fact that no outgoing ray intersects the microphone plane.

Returning to FIGS. 6(a)-6(b), the algorithm may be run with K=3, β=0.7 and μ=0.18. At this point, a (1, K) search may be conducted by having the routine choose $dv_1^i$ randomly, as explained with reference to FIG. 5. For the computation of the partial loss values associated with the triangles, a plurality of, e.g., 50, rays casted toward each triangle may be sampled. Note, often either all or none of the rays end up intersecting the microphone plane; however, sampling more rays reduces potential variance in the partial loss calculations, making the algorithm more robust.

Figure 8B:
FIGS. 8(a)-8(d) illustrate results and comparison of data resulting from execution of the algorithm in an experimental example illustrating the technical utility of implementation of the disclosed embodiments.
Figure 8A:
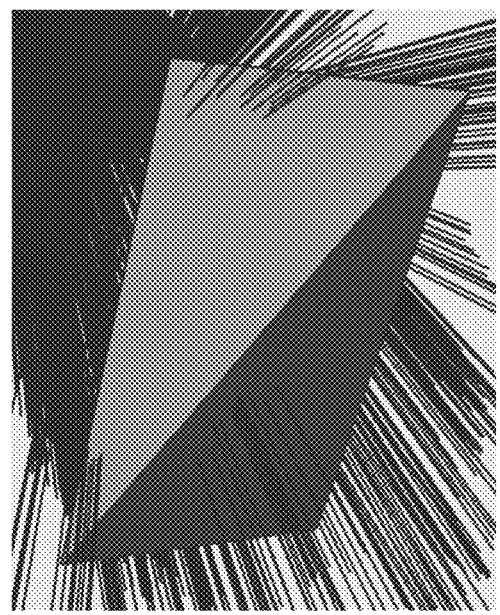
Figure 8D:
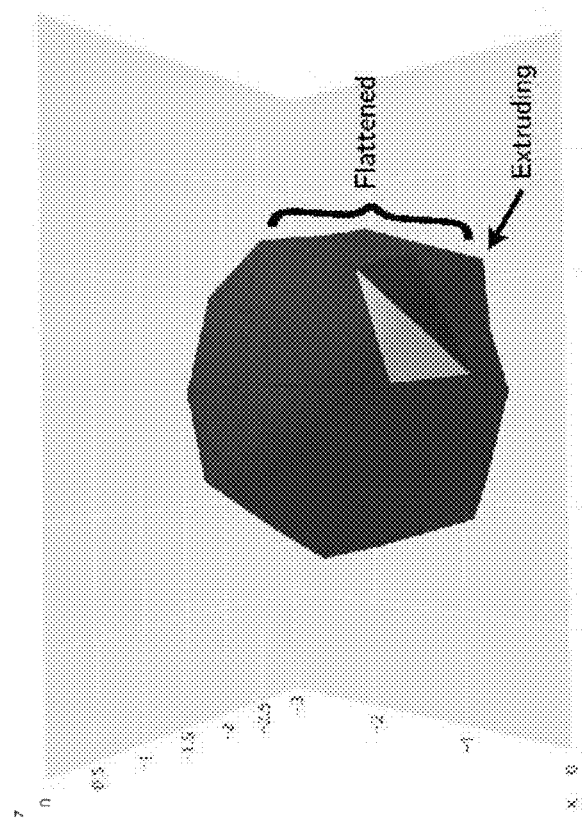

The resulting shape, as determined by the algorithm, is shown in FIG. 8(d). FIGS. 8(a)-8(d) illustrate results and comparison after executing the algorithm with the monopole at (0, 3, 2) with a lower step size. As one can see, the algorithm is successful in achieving its goal of minimizing the sound pressure, expressed in the number of sound rays, at the microphone. It has found a way to adjust the front triangles such that each ray will either scatter in the negative x direction or, if scattered backwards in the positive x direction, travels around the microphone plane. This is a consequence of the sharp tip the shape has obtained, which was absent in the case of the sphere.

As shown in FIG. 8(a), at first, before shape adjustment, rays intersect the microphone at three positions: at the upper left, at the upper right and slightly to the left of the center. As shown in FIG. 8(b), the shape returned by the optimization algorithm now reflects the rays, which would initially hit the corners of the microphone, away from it. However, the center rays seem to remain in place.

Figure 8C:
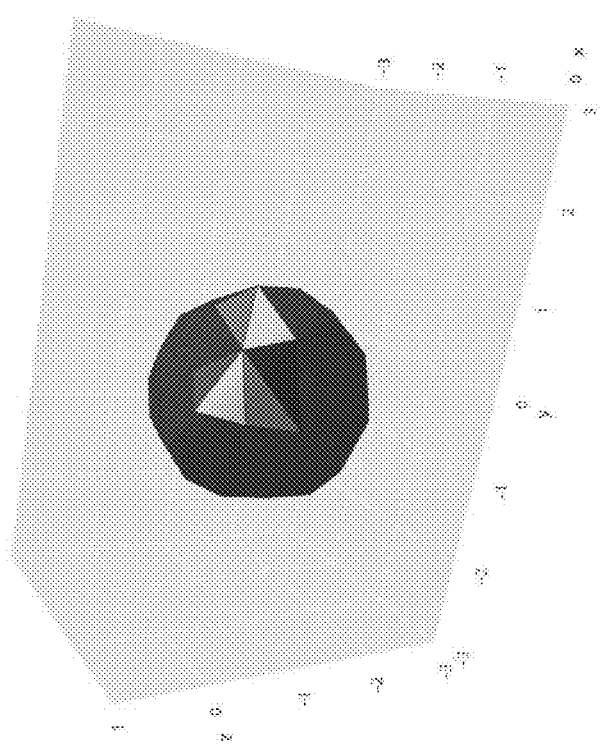

FIG. 8(c) illustrates partial loss shading of the initial sphere, wherein dark green triangles reflect no rays toward the microphone, while a darker shade of red indicates higher partial loss. Shade may be normalized to the maximum partial loss of any triangle.

FIG. 8(d) illustrates the final optimized shape, wherein the right side of the shape has been flattened, having an extruded point, which contributes to reflection away from the microphone.

Note, care should be taken to select an appropriate step size for use by the algorithm. Selecting a step size that is too low may render the algorithm incapable of sufficiently adapting the shape within a given number of iterations; this appears to be the result of becoming focused at a local, suboptimal point, which cannot be optimized any further. This may occur in particular with a (1+[K−1]) search. On the other hand, selection of a too high step size (especially in the case of (1, K) search) may result in generation of an optimized shape that is too irregular. A good example showing the consequence of choosing a too low step size can be seen in FIG. 8(a), in which the monopole was moved to (0, 3, 2) and a step size control β=0.3 was selected; although two sources of loss have been eliminated, one seems to be persistent. The result in FIG. 8(d) is that only two triangles have nonzero partial loss (note, although not shown in the figures, this result is lower than that of the sphere illustrated in FIG. 8(c))). As a result, the shapes illustrated in FIG. 8(d) is most likely considered as a local optimum by the algorithm, thus, there would be no further optimization thereafter by the algorithm.

As explained herein, disclosed embodiments provide a finite-element method for optimizing a three-dimensional shape under given physical criteria. By formulating an approximation of this finite-element problem in a QUBO form, and by embedding the corresponding matrix on the disclosed QPU, disclosed embodiments carry out finite-element design optimization, for example, on a D-Wave™ QPU. More specifically, by supplying an initial shape, disclosed embodiments may be used to be optimize the geometry to minimize a specified entity, such as sound pressure at a target area around the shape or the vibration of single elements, while partially preserve the geometry, which is particularly important when optimizing multi-function objects e.g., optimizing an outside mirror of a vehicle to minimize the noise at the vehicle passenger positions while preserving the properties the mirror must have.

In implementation, disclosed embodiments may be utilized to provide the technical utility of enabling optimization of geometry of a given shape (e.g., wherein an initial shape is provided for analysis and optimization), to, for example, minimize a specified quantity, such as sound pressure at a target area around the shape or the vibration of single elements, while, in the same instance, partially preserves the geometry of the shape. This technical capability is important because shapes have more than function or effect, e.g., supplying the design of an outside mirror of a transportation vehicle with the intention of minimizing the noise at the passenger's positions should still maintain a geometric and functional design that captures all the properties such a mirror must have, e.g., structural integrity, visability, accessability, etc.

It should be understood that disclosed embodiments differ from conventional solutions, which merely leverage classical algorithms and classical hardware. To the contrary, disclosed embodiments solve the finite elements design optimization problem by translating it into a mathematical formulation that can be solved on a quantum annealing system. Accordingly, disclosed embodiments provide the technical utility of a new finite-element methodology for optimizing three-dimensional shapes under specified (given) physical criteria.

By formulating an approximation of this finite-element problem in a QUBO form, and by embedding the corresponding matrix on the QPU, as specified, disclosed embodiments enable the capability of performing finite-element design optimization on a D-Wave™ QPU.

By usefully combining the computing power of a classical computer with that of a quantum computer, the sound pressure can be calculated on an initial geometry classically and, subsequently, the QPU can solve the problem prepared on the classical computer. Accordingly, technical utilize results from the disclosed combination of CPU and QPU operations that yield an optimized design solution. It should be understood that the algorithms and operations disclosed herein are running on one or more computers that contain a central processing unit, memory and additional components conventionally known and also disclosed herein that enable finite elements-based design optimization with quantum annealing and a system for performing that optimization. As used herein, "central processing unit" or "CPU" will refer to one or more processing units used for what if being referred to herein as classical computing. Thus, it should also be understood that such a system includes hardware for implementing a Quantum Processing Unit (QPU), on which quantum annealing algorithms are executed. The quantum annealing algorithms when executed, via the QPU, selects the optimized design.

Figure 9:
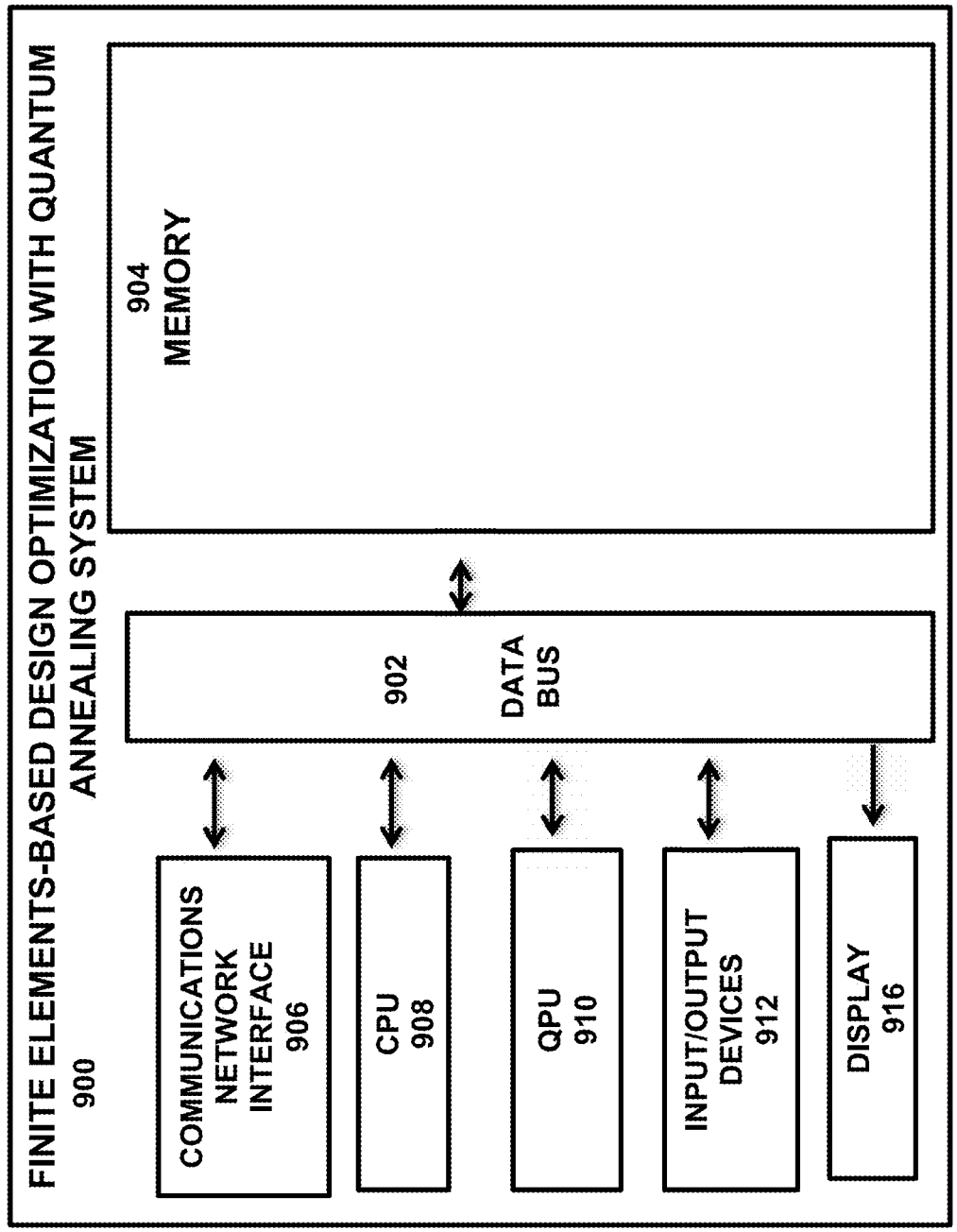
FIG. 9 illustrates an example of hardware that may be used to implement a system in accordance with the disclosed embodiments.

FIG. 9 is a schematic diagram of portions of a finite elements-based design optimization with quantum annealing system containing a central processing unit and a quantum processing unit. The method operations described above may be implemented by software and compiled and stored to a memory 904 as software code. During runtime, the software may be invoked for execution by a one or more processor, for example CPU 908 and quantum processing unit 910. A memory controller may manage the flow of data by interfacing between memory 904 and CPU 908 and QPU 910. A system or data bus 902 electronically connects memory 904 to communications network interface 906. The network may be, for example, the Internet or a proprietary network. Input/output device 912 communicates through system or data bus 902 with CPU 908 and quantum processing unit 910 to receive and transmit data and commands the components. Components of traffic system 900 may communicate with one another through any suitable electronic communication mechanism, such as a data bus 902 or cabling. Communication may also be provided wirelessly, such as (Wi-Fi), NFC, Bluetooth®, or other suitable technologies.

Communications network interface 906, which may include a network adaptor, allows the system to communicate over a network with other computers, server, the cloud or networking devices, such as over a LAN connection. A peripheral controller may be configured to facilitate operation of peripheral devices, such as input devices 912. Input/output devices 912 more generally refer to components to facilitate communications between other components whether or not the system is entirely automated, partially automated, or requires user input. A display 916, which may be associated with a display controller, may provide visual information to a user. Note, optionally the data generated by the system may be output ion files to manufacturing equipment for control of manufacturing of equipment optimized in accordance with the system and methods disclosed herein.

It will be understood that some of the components of FIG. 9 may be incorporated into a single device, or a plurality of devices. An operating system can manage computer hardware and software resources of the delivery system.

Embodiments include the methods described herein and their equivalents, a non-transitory computer readable medium programmed to carry out the methods and a system configured to carry out the methods, a computer system, and any sub-computer systems that include such machine readable storage medium containing an executable code; one or more processors; memory coupled to the one or more processors; an input device, and an output device connected to the one or more processors. The system and methods can be coordinated on a server or other communications network or system.

Various embodiments of the invention have been described, each having a different combination of elements. The invention is not limited to the specific embodiments disclosed, and may include different combinations of the elements disclosed, omission of some elements or the replacement of elements by the equivalents of such structures.

In accordance with at least some embodiments, additional constraints may be incorporated into the algorithm operations to further constrain a final shape. For example, it should be appreciated that the rear of the sphere illustrated in FIG. 7(d), at the far away end from the microphone, was deformed into a seemingly random structure. This is caused by the fact that no rays would hit this side in the first place; as such the quantum algorithm has no information about it (meaning the quadratic QUBO entries corresponding to those triangles are zero) and will choose a random vertex in each iteration. As such, it should be understood that, optionally, the disclosed embodiments may be modified to further include algorithm operations to prune these triangles in order to allow processing of more detailed shapes (containing more elements) on the QPU.

Likewise, wave behavior corrections may be incorporated in the algorithm to increase the degree of realism in the model. Thus, with this understanding of the combination of hardware and software in mind, it should be appreciated that at least some disclosed embodiments provide the technical utility of providing a means for embedding a matrix corresponding to quadratic unconstrained binary optimization on a processing unit to perform finite-element design optimization.

Further, it should be appreciated that the disclosed embodiments merely illustrate the technical utility of the disclosed invention and are not limited to the specific implementation of minimizing sound or the assumptions made to provide that solution. Thus, for example, the raycasting approximation referred to herein is not the only the model that may be used to model sound waves directly.

Furthermore, disclosed embodiments may solve this problem on a QPU, which further enables solving ever increasing complex design problems in the future, once more powerful QPUs are available. Likewise, disclosed embodiments similarly leverage developing, increasing sizes of hardware to maximize design investigation, analysis and optimization. Thus, the algorithm may be implemented so as to enable further scalability such that shapes with more elements may be processed by splitting the QUBO matrix, for example, using a decomposing solver such as the Qbsolv decomposing solver tool (which finds a minimum value of a large QUBO by splitting it into pieces solved either via a D-Wave™ system or a classical tabu solver) instead of having the D-Wave™ software find minor embeddings for shapes with few elements. Such an implementation may have additional technical utility by enabling determination of smoother geometries by quantum computing, quantum simulation, and quantum optimization.

As explained herein, the inventive concepts may be implemented to provide technical utility in that the various different implementations may perform "annealing," to solve combinatorial optimization problems at high speed. In accordance with at least some embodiments of the disclosed invention, the inventive concepts may be implemented, at least in part, using either quantum annealing, explained above, or what may be termed a "digital annealing," wherein a digital circuit implementation is used to solve the above-mentioned large-scale combinatorial optimization problems. For example, disclosed embodiments may utilize functionality provided by the digital annealer commercially available from Fujitsu™. In such an implementation, the sphere triangulation with 122 nodes and 8 alternatives per node results in zero impact after 28 iterations in less than 4 minutes (Digital Annealer V1) and stable convergence to final solution. Also, here, the conceptual approach generalizes to other shapes, other target functions, and finite element problems in general.

Because concepts of quantum mechanics provided by the above-described quantum annealer are what inspired such digital annealer, those concepts are mimicked by such digital annealers to provide improved computational speed and agility. More specifically, the quantum mechanics phenomenon conventionally referred to as "superposition," enables consideration of variables as simultaneously exists in two different states, i.e., 0 and 1. By emulating this quantum mechanics concept in a digital circuit, digital annealers are, emulate functionality available in quantum annealing implementations.

The invention claimed is:

1. A finite-element design optimization system for optimizing an object shape, the system comprising:
a computer processor configured to model acoustic sources on an object comprising a part of a transportation vehicle and generate finite elements data including an approximation of a shape-specific quantity characterizing the object shape as mathematical formulation for quadratic unconstrained binary optimization;
a quantum processing unit configured to solve the mathematical formulation as part of the quadratic unconstrained binary optimization by annealing; and
a Quadratic Unconstrained Binary Optimization algorithm that embeds a matrix corresponding to the quadratic unconstrained binary optimization on the quantum processing unit to perform finite-element design optimization,
wherein the results of execution Quadratic Unconstrained Binary Optimization algorithm is used to identify which sources contribute most significantly to sound perceived from a perspective of at least one passenger of the transportation vehicle;
wherein the finite elements are surface elements, an initial shape of the object shape is a sphere consisting of N surface elements, and the shape-specific quantity is sound emitted when the object shape is hit by sound waves emitted from an acoustic monopole.

2. The finite-element design optimization system of claim 1, wherein the formulation of the finite elements data uses a computer algorithm that includes a 3D search routine configured to iteratively analyze different candidate positions for each vertex in the object shape and, subsequently, as part of the solving of the mathematical formulation, the algorithm tasks the quantum processing unit to determine which vertex arrangement causes a least number of rays to be reflected toward a sensing location of the shape- specific quantity.

3. The finite-element design optimization system of claim 1, wherein the quantum processing unit is a quantum annealer configured to solve the mathematical formulation as part of the quadratic unconstrained binary optimization by quantum annealing.

4. The finite-element design optimization system of claim 3, wherein the quantum annealer is implemented using one or more algorithms belonging to the class of quantum-assisted algorithms.

5. The finite-element design optimization system of claim 1, wherein the quantum processing unit is a digital annealer configured to solve the mathematical formulation as part of the quadratic unconstrained binary optimization by digital annealing.

6. The finite-element design optimization system of claim 1, wherein a shape-specific quantity is minimized by manipulating the shape of the object using the quantum processing unit.

7. The finite-element design optimization system of claim 6, wherein the shape- specific quantity is an approximation of sound pressure at a specific position around the object.

8. The finite-element design optimization system of claim 7, wherein the sound pressure is created by sound waves scattered by the part of the transportation vehicle.

9. The finite-element design optimization system of claim 6, wherein the shape specific quantity is sound resulting from vibrations caused by an engine of the transportation vehicle or road conditions on which the transportation vehicle is to travel.

10. The finite-element design optimization system of claim 1, wherein the object is divided into a plurality of finite elements that are subdivisions of the object, wherein the shape-specific quantity for each finite element is modelled based on geometry of the finite element using one or more elementary functions, wherein the shape-specific quantity of the object is modelled in transitions between the finite elements through problem-dependent continuity conditions fulfilled by the elementary functions.

11. A method of performing finite-element design optimization to optimize an object shape, the method comprising:
modelling acoustic sources on an object comprising a part of a transportation vehicle and generating finite elements data including an approximation of a shape-specific quantity characterizing the object shape as mathematical formulation for quadratic unconstrained binary optimization;
solving, by a quantum processing unit, the mathematical formulation as part of the quadratic unconstrained binary optimization by annealing; and
embedding, using a Quadratic Unconstrained Binary Optimization algorithm, a matrix corresponding to the quadratic unconstrained binary optimization on the processing unit to perform finite-element design optimization.
wherein the results of execution Quadratic Unconstrained Binary Optimization algorithm are used to identify which sources contribute most significantly to sound perceived from a perspective of at least one passenger of the transportation vehicle;
wherein the finite elements are surface elements, an initial shape of the object shape is a sphere consisting of N surface elements, and the shape-specific quantity is sound emitted when the object shape is hit by sound waves emitted from an acoustic monopole.

12. The method for finite-element design optimization of claim 11, wherein the formulation of the finite elements data uses a computer algorithm that includes a 3D search routine configured to iteratively analyze different candidate positions for each vertex in the object shape and, subsequently, as part of the solving of the mathematical formulation, the algorithm tasks the quantum processing unit to determine which vertex arrangement causes a least number of rays to be reflected toward a sensing location of the shape- specific quantity.

13. The method for finite-element design optimization of claim 11, wherein the quantum processing unit is a quantum annealer configured to solve the mathematical formulation as part of the quadratic unconstrained binary optimization by quantum annealing.

14. The method for finite-element design optimization of claim 11, wherein the quantum processing unit is a digital annealer configured to solve the mathematical formulation as part of the quadratic unconstrained binary optimization by digital annealing.

15. The method for finite-element design optimization of claim 11, wherein a shape-specific quantity is minimized by manipulating the shape of the object using the quantum processing unit.

16. The method for finite-element design optimization of claim 15, wherein the shape-specific quantity is an approximation of sound pressure at a specific position around the object.

17. The method for finite-element design optimization of claim 16, wherein the sound pressure is created by sound waves scattered by the part of the transportation vehicle.

18. The method for finite-element design optimization of 19, wherein the shape specific quantity is sound resulting from vibrations caused by an engine of the transportation vehicle or road conditions on which the transportation vehicle is to travel.

19. The method for finite-element design optimization of claim 11, wherein the quantum annealer is implemented using one or more algorithms belonging to the class of quantum-assisted algorithms.

20. The method for finite-element design optimization of claim 11, wherein the object is divided into a plurality of finite elements that are subdivisions of the object, wherein the shape-specific quantity for each finite element is modelled based on geometry of the finite element using one or more elementary functions, wherein the shape-specific quantity of the object is modelled in transitions between the finite elements through problem-dependent continuity conditions fulfilled by the elementary functions.

* * * * *